(12) United States Patent
Ruffa

(10) Patent No.: US 12,357,438 B2
(45) Date of Patent: Jul. 15, 2025

(54) SYSTEM FOR IMPROVED CLEANING OF TEETH

(71) Applicant: Stephen Ruffa, Oak Hill, VA (US)

(72) Inventor: Stephen Ruffa, Oak Hill, VA (US)

( * ) Notice: Subject to any disclaimer, the term of this patent is extended or adjusted under 35 U.S.C. 154(b) by 0 days.

(21) Appl. No.: 18/623,951

(22) Filed: Apr. 1, 2024

(65) Prior Publication Data

US 2024/0277458 A1    Aug. 22, 2024

(51) Int. Cl.
*A61C 15/04* (2006.01)

(52) U.S. Cl.
CPC ................. *A61C 15/043* (2013.01)

(58) Field of Classification Search
CPC ....... A61C 15/00; A61C 15/04; A61C 15/041; A61C 15/043; A61C 15/046; A61C 15/047
See application file for complete search history.

(56) References Cited

U.S. PATENT DOCUMENTS

| | | | | |
|---|---|---|---|---|
| 3,830,247 A | * | 8/1974 | Kaphalakos | A61C 15/043 132/325 |
| 3,902,510 A | * | 9/1975 | Roth | A61C 15/043 132/322 |
| 4,019,522 A | * | 4/1977 | Elbreder | A61C 15/043 132/325 |
| 5,065,861 A | * | 11/1991 | Greene | A61C 15/041 242/171 |
| 5,076,302 A | * | 12/1991 | Chari | A61C 15/043 132/324 |
| 6,039,213 A | * | 3/2000 | Sloan | B65D 81/365 222/39 |
| 7,017,591 B2 | | 3/2006 | Brown | |
| 8,256,439 B1 | * | 9/2012 | Stinson | A61C 15/043 132/324 |
| 8,381,743 B1 | * | 2/2013 | Thomas | A61C 15/043 132/325 |
| 10,709,531 B1 | * | 7/2020 | Urso | A61C 15/04 |
| 2008/0257377 A1 | * | 10/2008 | Burrows | A61K 8/21 132/324 |

(Continued)

FOREIGN PATENT DOCUMENTS

| | | |
|---|---|---|
| WO | 2009132474 | 5/2009 |
| WO | 2011089282 | 7/2011 |

OTHER PUBLICATIONS https://liquiglide.com/.
https://www.packworld.com/design/materials-containers/article/21521030/colgate-toothpaste-in-pet-uses-liquiglide-coating.

*Primary Examiner* — Rachel R Steitz
*Assistant Examiner* — Karim Asqiriba

(57) ABSTRACT

A dental hygiene device for cleaning surfaces between adjacent teeth is disclosed. The dental hygiene device includes a housing configured to be held by a hand during flossing; where the housing includes a chamber within the housing; a toothpaste dentifrice solution contained within the chamber; and dental floss disposed within the housing on a spool, the dental floss and the spool configured to thread through the chamber, where the chamber comprises one or more apertures configured to allow the dental floss to receive a thin coat of the toothpaste dentifrice solution while passing through the chamber, where the chamber comprises a floss directing implement to improve adhesion of the toothpaste dentifrice onto the surface of the floss as it passes through the chamber.

13 Claims, 12 Drawing Sheets

(56) References Cited

U.S. PATENT DOCUMENTS

2016/0067020 A1\* 3/2016 Hintz ................ B65D 47/0804
                                                    132/325
2017/0172715 A1\* 6/2017 Duong ................ A61C 15/043
2019/0105137 A1\* 4/2019 Dishon ............... A61C 15/043

\* cited by examiner

SYSTEM FOR IMPROVED CLEANING OF TEETH

CROSS-REFERENCE TO RELATED APPLICATIONS

This continuation-in part application claims priority to U.S. application Ser. No. 18/241,947, titled "System For Improved Cleaning Of Teeth", filed Sep. 4, 2023, which is a continuation-in-part of and claims priority to U.S. application Ser. No. 17/894,342, titled "System For Improved Cleaning Of Teeth", filed Aug. 24, 2022, the entirety of which is incorporated here by reference.

BACKGROUND

Technical Field

This disclosure relates to dental hygiene. In particular, the disclosure relates to an improved system for cleaning teeth surfaces.

Dental hygiene tools are known in the art.

U.S. Pat. No. 5,076,302 describes an apparatus for and method of dispensing dental floss.

U.S. Pat. No. 7,071,591 describes particulate coated monofilament devices.

U.S. Pat. No. 8,381,743 describes a combined toothpaste container cap dental floss.

WO 2009/132474 describes dental floss coated with powder.

WO 2011/089282 describes a screw cap with dental floss deposit.

Examples of conventional art describe device with a chamber containing a floss spool, a second chamber containing a dentifrice solution, and apertures between the chamber and exiting the device through which the floss progresses. The dentifrice solution can be a liquid, powder, or a gel. Others describe devices that include an adaptor or inlet to receive a toothpaste tube wherein the coating of the floss occurs when the toothpaste tube is squeezed "as the floss passes through the openings in the main body of the device."

Other conventional art includes a dental floss dispenser that impregnates floss with a fluoride liquid solution. The container includes a hinge which reveals the inside of the device.

Yet another describes dental floss dispenser having a wicking delivery system with a reservoir for storing a solution of oral care ingredients primarily in fluid form. The reservoir includes an absorbent wicking porous pad that extends through at least a portion of the floss dispensing device to deliver the solution to the dental floss. When the floss is pulled through the porous pad holding the liquid, it is absorbed by the floss. This device has an exit aperture of up to 3 times the floss diameter, so the liquid is not squeezed off.

Good oral hygiene contributes to a person's overall health. It is widely understood that brushing teeth twice a day is important for good oral hygiene, as well as for maintaining an attractive smile and preventing bad breath. Cleaning between teeth is crucial as well. But cleaning between teeth is typically limited to flossing, which misses a key element that has been widely accepted as a standard part of effective brushing.

Brushing teeth typically consists of a two-part solution: direct mechanical-type cleaning from the toothbrush, combined with a mild abrasive from the toothpaste that is squeezed onto the toothbrush. The pairing of mechanical action with the mild abrasive is widely considered necessary for breaking up biofilm buildup on the tooth surfaces, a primary outcome that brushing is intended to achieve.

Brushing, however, only reaches approximately 60 percent of teeth's surfaces, leaving the surfaces between the teeth to be cleaned by flossing. Since there is no ready means for applying toothpaste to the floss as is done with a toothbrush, approximately 40 percent of the teeth's surfaces cannot be reached using the widely accepted method of pairing brushing with the mild abrasive accompaniment of toothpaste.

The disclosed device provides the means for cleaning the surfaces between the teeth similarly to brushing. It deposits a thin coating of toothpaste onto the surface of the floss by drawing it though a chamber filled with toothpaste, and then regulates the coating to deposit the needed abrasive ingredients, but sufficiently thin as to give the dental floss a moist but non-slippery feel which testing has shown does not interfere with flossing. Coating toothpaste on the floss also serves to lubricate the floss, permitting it to better glide into tight spaces. Finally, the floss delivers active ingredients from the toothpaste, particularly fluoride, to these surfaces that cannot be reached by brushing.

This disclosed device is unique in that no prior art is specifically designed to apply toothpaste to the surface of dental floss by drawing the floss through a chamber containing this dentifrice material and then regulating its coating to the needed surface thickness as it is drawn from the device. This disclosure identifies key features that solve the specific problems which were not identified by any prior art:

Adhering Dentifrice to the Floss: Prior art that disclose a similar configuration are primarily designed for use with dental solutions in liquid form, applied primarily by means of absorption into the dental floss. No prior art addresses the unique challenge of causing a toothpaste-type dentifrice to adhere to the surface of the floss by drawing the floss through a chamber of this semi-solid material. A key problem is that a rut is naturally created as the floss is drawn through a toothpaste dentifrice (something that does not occur with a liquid or powder), which causes the floss that that is subsequently drawn through the dentifrice to no longer be in contact thus preventing further adherence. This disclosure solves this problem using design details including chamber shapes, non-stick chamber materials, inserts, aperture shapes, floss spooling configurations, and implements developed through testing that can overcome this problem. Prior art does not include these and will not work for applying toothpaste dentifrice to dental floss without them.

Regulating the Coating Thickness: The optimal dentifrice coating is thick enough to deposit the needed abrasive ingredients, but sufficiently thin as to give the dental floss a moist but non-slippery feel which testing has shown does not interfere with flossing. The disclosed device produces this coating by regulating the final thickness of toothpaste dentifrice that can exit the device on the floss by dimensioning an exit aperture to a diameter that will remove dentifrice in excess of this thickness as the dental floss is pulled through it. Prior art instead cannot work in this manner, because it either identifies the exit aperture to be liquid-tight which would scrape off the toothpaste dentifrice coating, or of a sufficiently larger diameter than the floss diameter so that it that doesn't interact at all with the coated floss. For example, US 2013/0316070 A1 identifies that the diameter can be as much as three times the floss diameter because it first adequately impregnates the dental floss with a dentifrice using pads that rely on wicking—defined as absorption of liquid by capillary action—that specifically can only work with a liquid and cannot work for a non-liquid, toothpaste dentifrice. No prior art identifies the need for configuring the aperture dimension specifically to interact with a toothpaste dentifrice in order to regulate the coating thickness, which testing has shown is necessary to produce the combination of needed abrasive ingredients for removing biofilm and with surface characteristics that do not interfere with flossing.

Operating Seamlessly during Flossing: The disclosed device is designed to permit the user to comfortably hold the device during flossing and draw coated floss from the container while flossing. This fundamentally differs from prior art which identifies a size which might only incidentally suffice to be held by hand but is not designed to seamlessly withdraw floss coated with toothpaste dentifrice during flossing, nor does it contain the internal configuration, including the dentifrice chamber shape, materials, and/or inserts, along with the configuration of the exit aperture and apertures between chambers, allowing it to automatically coat floss with a toothpaste-like dentifrice of an optimal thickness as it is drawn from the device while flossing. The external size and shape of the disclosed device, in conjunction with the internal aspects, work together to make it possible to hold the device while dispensing floss with the needed coating of toothpaste dentifrice during flossing. A second configuration is disclosed, intended to be attached to a toothpaste tube and permits the user to withdraw a length of coated floss and clip it off for use prior to flossing. The disclosed device is fundamentally different from all prior art in that it is designed to automatically coat the floss with a toothpaste-like substance as it is drawn through toothpaste dentifrice contained in the device and includes an exit aperture that regulates the dentifrice thickness on the floss surface to deposit the needed abrasive ingredients while producing a surface that is sufficiently thin to form a non-slippery consistency when it is drawn from the device.

Although conventional art describes a device that uses a toothpaste-type dentifrice, it does not apply the dentifrice in the same manner and will not work to perform the necessary functions. Instead of coating the floss by drawing it through an unpressurized dentifrice chamber as the disclosed device does, conventional art coat the floss using direct pressure imparted by squeezing an attached toothpaste tube positioned directly over the floss. This cannot meet the need to operate seamlessly during flossing, since the user would have to concurrently hold the device while squeezing the tube, while also withdrawing the floss. Moreover, conventional art identifies that the opening through which the floss travels from the spool chamber must be tight fitting to prevent pressurized dentifrice from migrating into the chamber containing the floss spool, which cannot work with design details that cause adhesion of toothpaste dentifrice to the dental floss in the disclosed device. Conventional art does not describe any role of the exit aperture in coating the floss, which is critical to the operation of the disclosed device. Therefore, the concept and structure described by conventional does not address key elements of this design, are fundamentally different and therefore not relevant, and cannot be made to work to produce the same results.

Therefore, a need exists for a dental solution for providing a similar degree of cleaning as tooth brushing for the surfaces between teeth.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

A dental hygiene device for cleaning surfaces between adjacent teeth is disclosed. The dental hygiene device includes: a housing configured to include a chamber within the housing; a toothpaste dentifrice solution contained within the chamber; and dental floss disposed within the housing on a spool, the dental floss configured to thread through the chamber, where the chamber comprises one or more apertures configured to allow the dental floss to receive a thin coat of the toothpaste dentifrice solution while passing through the chamber, where the dental hygiene device comprises a floss directing implement and/or a non-stick surface to improve adhesion of the toothpaste dentifrice onto the surface of the floss as it passes through the chamber, the dental floss further configured to exit the chamber through an inner exit aperture of the one or more apertures in the housing, the inner exit aperture configured to extend out of the housing through an outer exit aperture, where a diameter of the inner exit aperture is sized with a sufficiently greater diameter than a diameter of the dental floss to regulate the amount of dentifrice that passes through the aperture on the floss to allow sufficient abrasive ingredient to coat the floss, but no larger than is needed to allow enough dentifrice to pass through to produce a non-slippery surface on the floss to not interfere with flossing, and where the housing size and shape are specifically configured to permit the device to be comfortably held while also drawing floss coated with dentifrice from the device while flossing, or the housing may be configured to permit the user to withdraw a length of coated floss and clip it off for use prior to flossing. In an aspect, the dental hygiene device may include a dental tape with an exit aperture with a slotted shape sized with sufficiently greater dimensions than a thickness of the dental tape to regulate the amount of toothpaste dentifrice solution that passes through the exit aperture on the dental tape.

In an aspect of the disclosure, a dental hygiene device for cleaning between surfaces of teeth is disclosed. The dental hygiene device includes a first chamber containing dental floss positioned around a spool, the first chamber positioned within the dental hygiene device, where the first chamber comprises a first aperture through which the dental floss exits the first chamber; a second chamber containing a toothpaste dentifrice solution, the second chamber positioned proximate to the first chamber, where the second chamber is positioned within the dental hygiene device, and the second chamber includes an inlet aperture positioned on a first surface of the second chamber and proximate to and in mechanical communication with the outlet aperture of the first chamber, where the dental floss that exits the first chamber enters the inlet aperture of the second chamber, where the second chamber is configured to allow the dental floss to receive a thin coat of the toothpaste dentifrice solution on a surface of the dental floss while passing through the second chamber. In an aspect, the first chamber may include a spool onto which the floss is directed, the spool in coordination with different floss directing implements causing the dental floss to move back and forth from a first side of the first chamber to a second side of the first chamber with respect to a center of the first chamber as the dental floss is drawn from the spool and through the different floss implements, and changing an angle and a path that the dental floss exits the first chamber through a first outlet aperture through which the dental floss exits the first chamber and the inlet aperture into the second chamber, causing the dental floss to sweep across the second chamber as it is drawn through the second chamber, causing improved contact with the toothpaste dentifrice solution; and improving adherence of the toothpaste dentifrice solution onto the surface of the dental floss as it passes through the second chamber; a second outlet aperture positioned on a second surface of the second chamber, where the dental floss exits the second outlet aperture and out of the dental hygiene device, where a diameter of the second outlet aperture is sized with a sufficiently greater diameter than a diameter of the dental floss to regulate the amount of toothpaste dentifrice solution that passes through the second outlet aperture on the dental floss to allow a continuous distribution of abrasive ingredients to coat the dental floss, but no larger than is needed to allow a dentifrice thickness to pass through that leaves a sufficiently thin film to not interfere with flossing.

In an aspect of the disclosure, the spool may include a non-circular or eccentric spool or a non-circular or eccentric pulley or cam.

In an aspect of the disclosure, the first chamber may include a different floss directing implement, where the different floss directing implement includes a solid, non-flexible rod, the rod having a first end movably and pivotably fixed to an interior base surface of the dental hygiene device, with a second end of the rod free to move; where the rod has a hole in the second end that the dental floss is threaded through as it leaves the spool; where the rod is inserted in a slot within a peg affixed to the spool so the peg can rotate freely within the spool; where the spool rotates as the floss is drawn from the spool, thereby causing the peg to move with the spool, resulting in a lateral displacement of the peg and causing movement of the rod inserted in the peg through the slot, causing an end of the rod through which the dental floss is threaded to swing back and forth from a first side of the first chamber to a second side with respect to a center of the first chamber, causing the floss to move back and forth as the dental floss exits the first chamber into the dentifrice chamber; causing the dental floss to sweep across the second chamber as it is drawn through the dentifrice chamber, and improving the adherence of the toothpaste dentifrice solution to the floss.

In an aspect of the disclosure, the first chamber may include a different floss directing implement such as a rod, where the rod includes a first end movably and pivotably fixed to an interior base surface of the dental hygiene device, with a second end of the rod free to move; where the rod has a hole in the second end through which the floss is threaded as it leaves the spool; where the rod includes a slotted hole through which a peg that is affixed to the spool is inserted into within the rod such that the peg can move back and forth and rotate freely within the slot; where the spool rotates as the dental floss is drawn from the spool, causing the peg to move with the spool, resulting in a lateral displacement of the peg and causing movement of the rod through which the peg is inserted, causing a rod end through which the dental floss is threaded to move back and forth from a first side of the first chamber to a second side of the chamber with respect to a center of the first chamber, causing the dental floss to move back and forth as the dental floss exits the first chamber and into the second chamber; causing the dental floss to sweep across the second chamber as it is drawn through the second chamber, causing improved contact with the toothpaste dentifrice solution and improving the adherence of the toothpaste dentifrice solution to the dental floss.

In an aspect of the disclosure, the dental hygiene device may be configured to mate with a stand for holding the dental hygiene device vertically between usages, where the dental hygiene device rests vertically with the second chamber positioned toward a bottom of the stand to allow the toothpaste dentifrice solution to settle near the aperture through which the floss exits the dental hygiene device, and the stand is configured to cover the aperture when the dental hygiene device is not in use.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 9A provide a view of the claimed invention where the peg 908 is in a far-left position. FIG. 9B provide a view of the claimed invention where the peg 908 is in the bottom position. FIG. 9C provide a view of the claimed invention where the peg 908 is in a far-right position.

DETAILED DESCRIPTION

Figure 1:
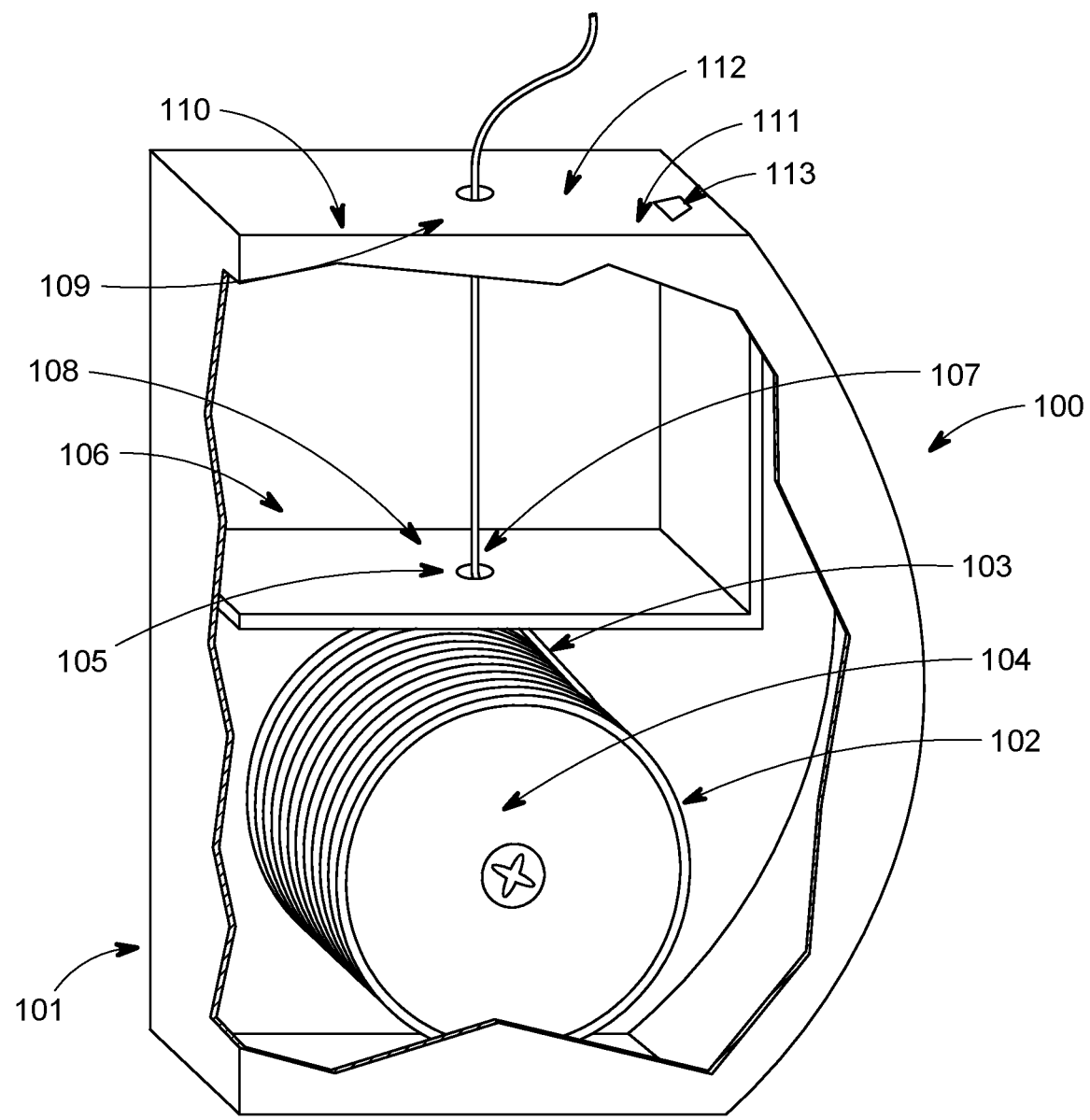
FIG. 1 is a view of a first aspect of a dental hygiene device according to the disclosure.

In view of the known types of apparatus and methods present in the prior art, this invention provides a new and improved dental floss dispenser which specifically addresses the need to pair the mechanical cleaning action that comes from flossing with the mild abrasive action from toothpaste to provide a cleaning method for the surfaces between the teeth, producing a similar result to the approach that has been widely accepted for brushing the other teeth surfaces.

As such, the general purpose of this invention is to deposit a thin coating of toothpaste onto the surface of the floss which contains a mild abrasive, similar to applying toothpaste to a toothbrush as is typical when brushing teeth. The toothpaste on the floss also serves to lubricate the floss, permitting the floss to better glide into tight spaces. Finally, the coated floss also delivers active ingredients contained within the toothpaste, particularly fluoride, to these surfaces that cannot be reached by brushing.

The disclosed device works by automatically depositing a thin coating of toothpaste onto the surface of the floss by drawing it though a toothpaste dentifrice, with its exit aperture dimensioned for regulating the thickness on the floss as it is drawn from the device, giving the floss a sufficiently thin film to not interfere with flossing but thick enough to deposit the needed abrasive ingredients on the floss. Its general configuration includes: a dispensing device designed to be able to be held by a hand, a first chamber containing dental floss positioned around a spool, the first chamber positioned within the dispensing device, where the first chamber comprises a first outlet aperture through which dental floss exits the first chamber, a second chamber containing a toothpaste dentifrice solution, the second chamber positioned proximate to the first chamber, where the second chamber is positioned within the dispensing device, and the second chamber includes an inlet aperture positioned on a first surface of the second chamber and proximate to and in mechanical communication with the outlet aperture of the first chamber, where the dental floss that exits the first chamber enters the inlet aperture of the second chamber and an outlet aperture positioned on a second surface of the second chamber, where the dental floss exits the outlet aperture and out of the dispensing device, which is dimensioned to regulate the coating thickness on the dental floss. The second chamber may be shaped to improve dentifrice adhesion, may contain non-stick materials or treatments, and may contain floss directing elements such as pins or baffles or inserts such as a membrane or bladder through which the floss may be positioned within the second, dentifrice, chamber. The membrane or bladder containing dentifrice may be configured as a convenient source for replenishing the dentifrice within the device. The spool within the first chamber around which the dental floss is positioned may be configured in a way that is non-circular, such as positioned on an asymmetric cam, causing the positioning of the dental floss as it is drawn from the spool to vary, thus constantly changing the path that the dental floss moves as it exits the chamber, through the inlet aperture into the second chamber, and through the second chamber, causing the dental floss to sweep across the second chamber which can provide improved contact with toothpaste dentifrice solution within the second chamber. Other features and implements may produce this result while minimizing dimensional requirements and thus supporting the device sizing constraints for a handheld configuration.

Making this device work required innovations in three areas, which were only identified from producing and testing alternate configurations, and are disclosed:

First, this device solves the problem of causing a toothpaste-like dentifrice to evenly adhere to floss as it is drawn through the dentifrice chamber. As the floss advances through the dentifrice chamber, its tendency is to erode a rut through the dentifrice, forming a gap between the dentifrice and the dental floss which can reduce contact with the dental floss and may cause a reduced adherence of the dentifrice to the floss. This device includes features that address this problem so that the floss may remain in close proximity with the toothpaste and continues to adhere even as the toothpaste dentifrice is depleted. These features work in conjunction with the aperture that is sized to limit the amount of dentifrice that is drawn from the chamber, both regulating the finished surface on the dental floss and causing dentifrice to accumulate inside of the aperture as excess is scraped from the dental floss which promotes greater contact with the floss and thus improved adhesion. The chamber can be lined with a non-stick material (such as Teflon) or have other non-stick treatment, which reduces the adhesion to the chamber walls, and the chamber can be narrowed so that its walls remain in closer proximity to the floss thereby creating greater affinity for the dentifrice to adhere to the floss than to adhere to the chamber walls, reducing the potential for dentifrice to separate or cause a rut rather than adhere to the floss. Testing has demonstrated a reduced potential to create a rut when the distance of the floss from Teflon lined chamber walls is reduced to approximately a quarter of an inch. Alternatively, the spool within the first chamber around which the dental floss is positioned may be configured in a way that is non-circular, with a shape causing a change to the positioning of the dental floss from the center of the spool as it is drawn from the spool, thus constantly changing the path that the dental floss moves as it exits the chamber, through the inlet aperture into the second chamber, and through the second chamber, causing the dental floss to sweep across the second chamber which can provide improved contact with toothpaste dentifrice solution within the second chamber.

Another approach may include the use of floss directing implements, which may include mounting the dental floss from the floss spool onto a non-circular cam of a shape that causes change in the positioning of the dental floss as it is drawn over the cam, or may draw the dental floss onto a non-circular cam which may act in conjunction with a peg, wire, rod, or other elements that change the path that the dental floss progresses as it departs the cam, exits the chamber, progresses through the inlet aperture into the second chamber, and through the second chamber, causing the dental floss to sweep across the second chamber which can provide improved contact with toothpaste dentifrice solution within the second chamber. The inlet aperture through which floss exits the first chamber and enters the second chamber can be slotted or otherwise shaped, allowing the angle of the floss to change, thereby causing the floss to sweep across the chamber, changing the location of the floss within the chamber rather than reducing the size of the chamber, overcoming the tendency to create a rut in the dentifrice. Baffles, pegs, or other mechanical means, such as adding implements for directing the floss back and forth as it exits the floss chamber, may also be used to alter the pathway of the floss and to cause accumulation of dentifrice in the path of the floss, thereby improving adhesion. Alternative configurations of the second chamber to improve the adhesion of toothpaste dentifrice on the floss include but are not limited to passing the floss through a bladder or membrane containing the dentifrice, which may further comprise a non-stick material or treatment deposited on the inner surface, that collapses as dentifrice is consumed, causing the dentifrice to draw towards the floss as it is diminished, thus maintaining dentifrice in close proximity to the floss to promote adhesion. No prior art identifies this issue or identifies these or any configurations that overcome the problems of making toothpaste adhere to the floss as the floss is drawn through the toothpaste dentifrice.

Second, this device interacts with the dentifrice to form a coating on the floss that does not interfere with the act of flossing. A coating of toothpaste dentifrice on the floss that is too thick will produce a slippery, messy surface that makes it difficult to hold and use the dental floss as intended, thereby interfering with the act of flossing. The disclosed device instead produces a surface, identified from testing, that is non-slippery but thick enough to deposit the needed abrasive ingredients. The disclosed device actively regulates this thickness using the aperture through which the floss exits the device, which is dimensioned to permit the floss to pass through while coated with a dentifrice thickness that is sufficient to deposit sufficient abrasive particles but no greater, to produce this surface on the floss. The aperture diameter is slightly larger than the diameter of the floss, with a sufficiently large diameter to produce a minimal but sufficiently thick film of toothpaste on the floss surface to allow a continuous distribution of suspended abrasive particles to pass through the aperture as floss is drawn from the device. One example demonstrated during testing is of an aperture dimensioned to approximately 1.2 times the diameter of the dental floss. No prior art identifies this issue or identifies these or any configurations that overcome the problems of regulating the coating to produce the needed finish using this semi-solid dentifrice substance on floss.

Third, this device operates in a manner that is simple, intuitive, and seamless so as to not complicate the act of flossing. This disclosure includes two configurations, each designed specifically to meet this need. The first is a handheld configuration that permits the user to comfortably hold the device and seamlessly draw coated floss from the container while flossing. This fundamentally differs from prior art which identifies a dispenser that is only incidentally of a size that can be held by hand, whereas this disclosure combines an external size and shape specifically designed to allow for this purpose. The combination of its external size and shape with its automatic coating of toothpaste dentifrice on the floss as it is drawn from the device during flossing, work together to allow its simple, seamless use during flossing. Making this possible are configuration details, identified by trial and error, including external size and shape, the dentifrice chamber shape, materials, inserts, mechanical features, and the configuration of the exit aperture. One example demonstrated during testing is of an external housing dimension of approximately 2.74 inches in height, 1.84 inches in width, and 0.74 inches in thickness with the exterior curved on one side and an indentation at the location of the aperture where the floss exits the device which may be used to aid in regulating the movement of the floss during use. A second disclosed configuration is intended to be attached to a toothpaste tube and permits the user to withdraw a length of coated floss prior to flossing and use it just as is typically done during flossing. Squeezing the toothpaste tube does not directly apply toothpaste to the floss, as it does with other conventional art, but serves as a means for refilling the dentifrice chamber. Like the first configuration, the dentifrice adheres to the floss within the disclosed device as it is drawn through the chamber, with the exit aperture dimensioned to actively regulate the final dentifrice coating thickness on the floss. The dental hygiene device may also alternatively include, in an aspect of the disclosure, a dental tape with an exit aperture with a slotted shape sized with sufficiently greater dimensions than a thickness of the dental tape to regulate the amount of toothpaste dentifrice solution that passes through the exit aperture on the dental tape. Making this possible are the same internal configuration and details, including the configuration of the exit aperture. Other attempts in the conventional art are fundamentally different in that they do not contain this configuration or necessary details, and therefore it is irrelevant, and no part of its design could inform the invention of this device.

The dental hygiene device may provide multiple ways to replenish toothpaste in the chamber, including directly attaching the dispenser to a toothpaste tube, and a disposable version in which sufficient toothpaste to coat a single spool of floss is contained in the unit. A replaceable bladder or membrane containing dentifrice within the second chamber may be configured as a means for replenishing the dentifrice within the device, which may further comprise a non-stick material or treatment deposited on the inner surface. A reusable version may include a clamshell construction, hinged on one side and snapping closed on the other, which opens the chamber and exposes the spool, making replacing both the floss and refilling the chamber with toothpaste quick and simple. In an aspect of the disclosure, the dental hygiene device may include an opening to reveal an inside of the dental hygiene device for filling the second chamber containing the toothpaste dentifrice solution and replacing the spool, and where the opening may be configured as a movably sealable opening to fill the second chamber while preventing leakage through the dental hygiene device during use. The device may be configured to mate with a stand in which the device may be stored between usages, positioning the device vertically with the dentifrice chamber at the bottom to allow the dentifrice to settle near the aperture through which the floss exits the device.

The dental hygiene device provides three capabilities that are essential for a practical solution. First, it provides a simple, repeatable means for applying a thin coating of toothpaste (or another substance with similar properties and abrasion action) on dental floss as it is used. It does this by drawing the floss through the dentifrice, and then regulating its thickness for a thin, non-slippery film that provides sufficient abrasive materials but without interfering with the act of flossing. Second, it is configured to operate in a manner that is simple, intuitive, and seamless so as to not complicate the act of flossing. This includes two basic configurations: handheld, which is specifically designed so it may be held and the floss extracted while flossing; and a configuration that is attached as an extension to the tube that allows for length of coated floss to be extracted prior to flossing (and toothpaste to be dispensed onto a brush through a separate nozzle). Third, these dispensing device configurations may include both reusable and disposable versions, all using the same basic concept and design features for coating the dental floss for a surface that does not interfere with flossing, and configured to operate in a manner that is simple, intuitive, and seamless. Reusable versions include a capability to recharge the dentifrice and/or floss spool using multiple concepts and configurations.

FIG. 1 illustrates a view of an aspect of the basic configuration of the disclosed dental hygiene device 100. The dental hygiene device 100 includes a dispensing device 101 configured to be held by a user's hand. A first chamber 102 may contain dental floss 103 positioned around a spool 104, the first chamber 102 positioned within the dispensing device 101, where the first chamber 102 comprises a first outlet aperture 105 through which dental floss 103 exits the first chamber 102. A second chamber 106 may contain a dentifrice solution, the second chamber 106 positioned proximate to the first chamber 102, where the second chamber 106 is positioned within the dispensing device 101, and the second chamber further includes an inlet aperture 107 positioned on a first surface 108 of the second chamber 106 and proximate to and in mechanical communication with the outlet aperture 105 of the first chamber 102. The dental floss 103 may exit the first chamber 102 and enter the inlet aperture 107 of the second chamber 106. A second outlet aperture 109 is positioned on a second surface 110 of the second chamber 106, where the dental floss 103 may exit the second outlet aperture 109 and out of the dispensing device 101. The second chamber 106 may be configured to contain a bladder or membrane containing the toothpaste dentifrice solution, which may further include a non-stick material or treatment deposited on the inner surface, where the bladder or membrane may collapse as the dentifrice is consumed, causing the dentifrice to draw towards the dental floss 103 as it is diminished, thus maintaining dentifrice in close proximity to the floss 103 to promote adhesion. The bladder or membrane may be configured as a means for replenishing dentifrice in chamber 106. The dental hygiene device 100 may include a hand-held dispenser designed to be grasped by a user during flossing. The dental hygiene device 100 may be configured to fit comfortably into the user's hand, allowing the dental floss 103 to be extracted by the user through the second outlet aperture 109 located between a thumb and index finger of the user, which may be a location that makes it easy to hold the dental hygiene device 100 while grasping the floss 103 during flossing. Pulling the floss 103 from the dispensing device 101 as it is needed during flossing minimizes the amount of toothpaste that rubs off during use. In another aspect of the disclosure, the dental hygiene device 100 may include, positioned on the dispensing device 101, a tab 111 positioned on a surface 112 of the dispensing device 101, where the tab 111 is angled outwardly relative to the surface 112 of the dispensing device 101, and the tab 111 may include a clipper edge 113 configured to accept the dental floss 103 and sever the dental floss 103. When flossing is complete the floss 103 may be cut off on the clipper edge 113.

Figure 2:
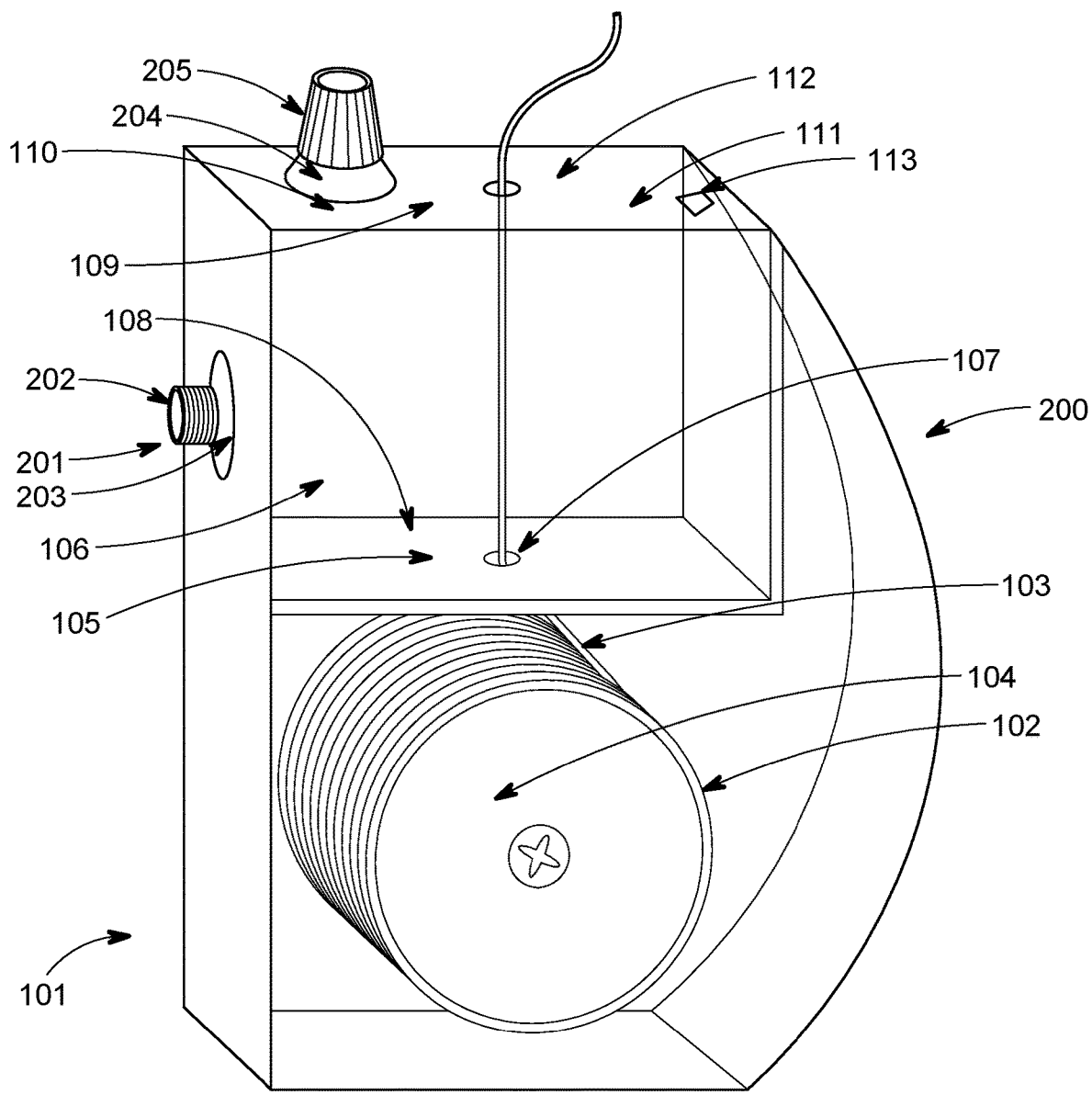
FIG. 2 is a view of a second aspect of a dental hygiene device according to the disclosure.

FIG. 2 is a view of a second aspect of a dental hygiene device 200 according to the disclosure. The dental hygiene device 200 may include a dispenser adaptor 201. The dispenser adaptor 201 may be adaptively coupled to the dispensing device 101 and may allow attachment of the dispensing device 101 to a toothpaste tube (not shown) and is intended for coating the desired length of floss 103 prior to each usage, clipping it off with the clipper edge 113. The toothpaste tube may be screwed into the dispensing device 101 via the dispenser adaptor 201, attached at 202 to nozzle 203. The toothpaste tube automatically fills the second chamber 106 within the device each time toothpaste is squeezed for use. An outlet nozzle 204 may be disposed on the outer surface 110 of the dental hygiene device 200, configured as an alternate means for dispensing toothpaste from the chamber 106 through nozzle 204 during brushing and flossing when the toothpaste container (not shown) is squeezed. The outlet nozzle 204 may include a cap 205 disposed upon the outlet nozzle 205 to prevent leakage of toothpaste.

The dental hygiene devices 100 and 200 may include a range of design features to enhance coating of the floss 103. The dental hygiene devices 100 and 200 may include non-stick coatings or treatments, bladders, or membranes to enhance coating of the floss 103. The dental hygiene devices 100 and 200 may include floss directing implements such as pegs or rollers and implements to direct the floss 103 within the dispensing device as it moves through the dispensing device 101.

Figure 3:
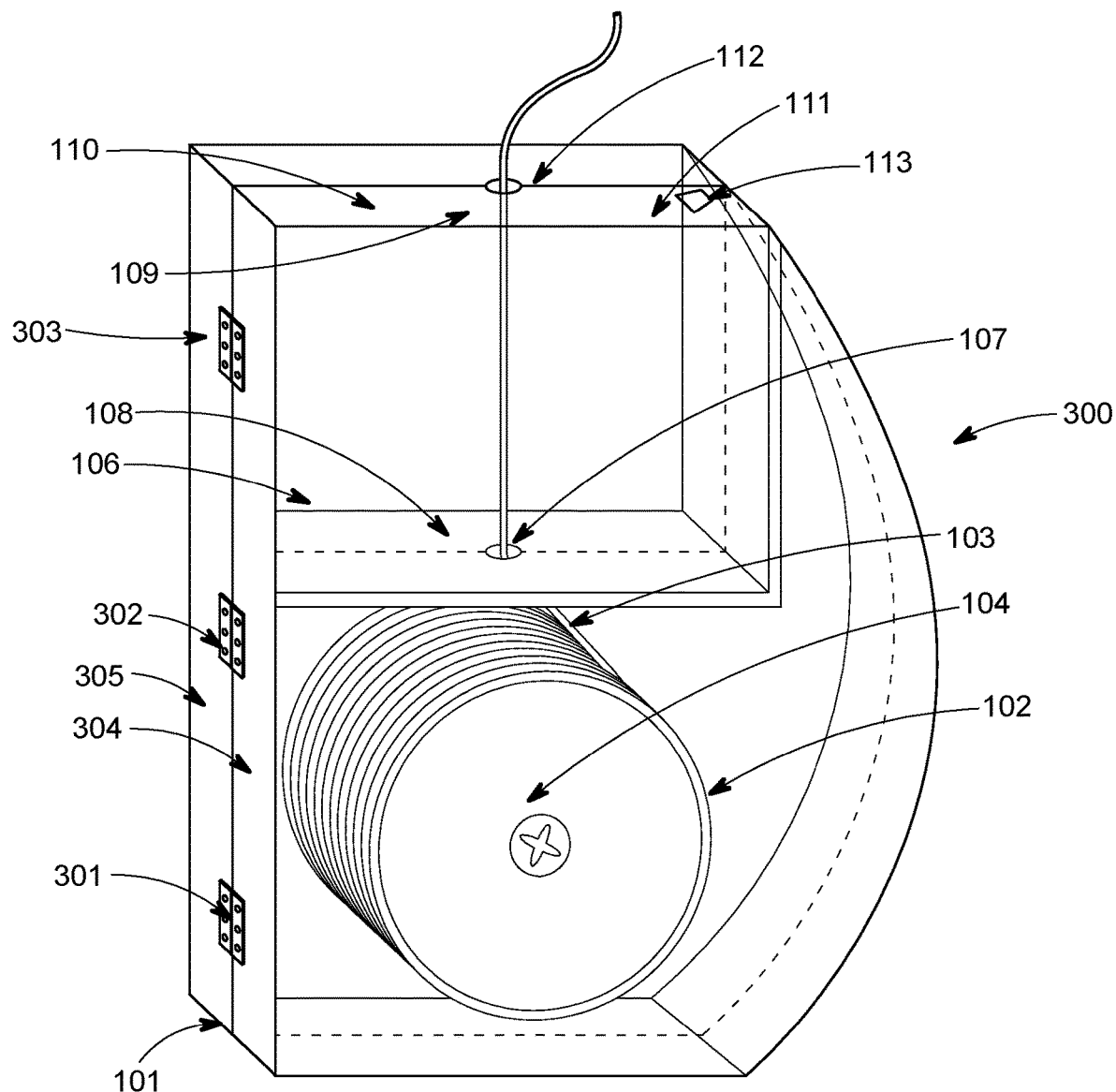
FIG. 3 is a view of a third aspect of a dental hygiene device according to the disclosure.

FIG. 3 is a view of a third aspect of a dental hygiene device 300 according to the disclosure. The dental hygiene device 300 may be configured as a reusable system. The dental hygiene device 300 may include a first hinge 301, a second hinge 302 and a third hinge 303, each adaptively coupled with and disposed on the dispensing device 101. The first hinge 301, the second hinge 302 and the third hinge 303 may allow the dental hygiene device 300 to be configured as a clamshell construction, hinged so that a first hinged surface 304 may move relative to a second hinged surface 305 and along the axis of the first hinge 301, the second hinge 302 and the third hinge 303 so that the dental hygiene device 300 may be snapped closed. These hinges may be combined as one continuous hinge or replaced with other methods for opening and attaching the first surface 304 and the second surface 305.

Figure 4:
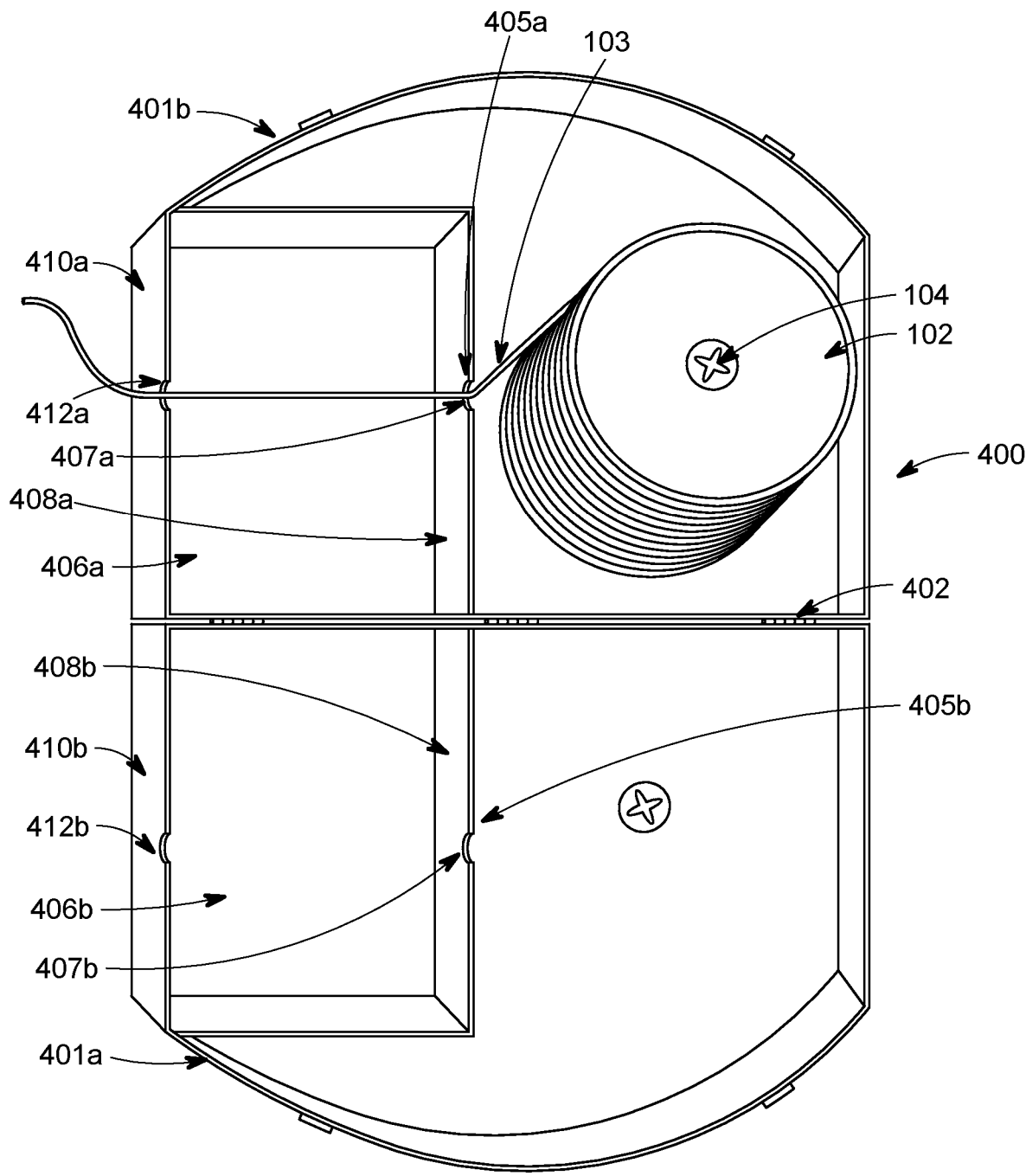
FIG. 4 is a view of a fourth aspect of a dental hygiene device according to the disclosure.

FIG. 4 is a view of fourth aspect of a dental hygiene device 400 according to the disclosure. In this aspect of the disclosure, a clamshell open-view of the dental hygiene device 400 is displayed. The dental hygiene device 400 may include a first open surface 401a and an opposing second open surface 401b. When the first open surface 401a is moved about a hinge 402, the first open surface 401a meets congruently with the second open surface 401b to form a fully closed dental hygiene device 400, similar to the dental hygiene device 300 depicted in FIG. 3.

In an aspect of the disclosure, the dental hygiene device 400 may include corresponding parts on either side of the hinge 402 that join together when the dental hygiene device is closed. The dental hygiene device 400 may thus include a first inner chamber outlet 405a and a second inner chamber outlet 405b that match each other when joined via movement about the hinge 402. The dental hygiene device 400 may thus include a first upper chamber inlet 407a disposed upon a surface 408a of a first upper chamber 406a and a second upper chamber inlet 407b disposed upon a second surface 408b of second upper chamber 406b that match each other when joined via movement about the hinge 402. The dental hygiene device 400 may include a first upper chamber outlet 412a disposed upon a first outer surface 410a of a first upper chamber 406a and a second upper chamber outlet 412b disposed upon a second outer surface 410b of the second upper chamber 406b that match each other when joined via movement about the hinge 402.

Figure 5:
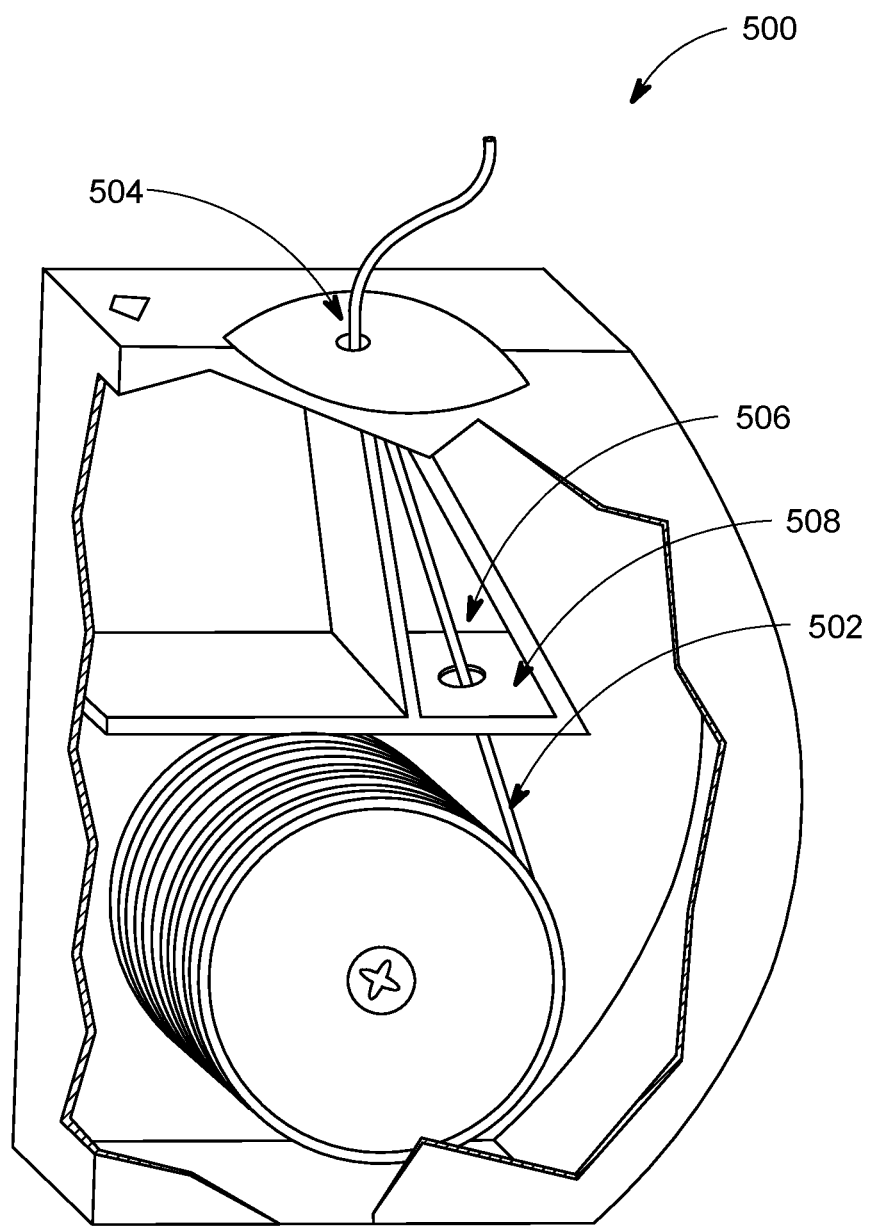
FIG. 5 is a view of a fifth aspect of a dental hygiene device according to the disclosure.

FIG. 5 is view of a fifth aspect of a dental hygiene device 500 according to the disclosure. The dental hygiene device 500 includes design details and/or floss directing implements(s) applied to or modifying the basic device configuration 100 that solve the problem of maintaining adhesion between the pool of dentifrice as the dental floss 502 is drawn through it to coat the floss. This performs two functions: First, it prevents the erosion of a rut that separates the dentifrice from the dental floss 502 and prevents its adhesion to the dental floss 502, which is required to coat the dental floss 502. Second, maintaining this adhesion of dentifrice to the dental floss 502 allows the dental floss 502 to draw the dentifrice toward the exit aperture 504 as the dentifrice is depleted in the dentifrice chamber 506, thus ensuring it remains near the dental floss 502 so that it can be consumed during usage. This works in conjunction with an exit aperture 504 that is designed to restrict the coating of dentifrice on the dental floss 502 as it exits the dental hygiene device 500, thus allowing dentifrice to accumulate inside of the exit aperture 504.

There are two primary causes for breaking the needed adhesion to the floss as it is drawn through the dentifrice, which causes the erosion of a rut: too great of an opposing adhesion of the dentifrice to the surrounding surfaces, and a column of dentifrice that is too large, creating too much resistance for the surface adhesion to overcome.

The dental hygiene device 500 illustrated in FIG. 5 solves the floss adherence problem by narrowing the second, dentifrice chamber 506, in conjunction with lining an inside surface 508 of the dentifrice chamber 506 with a non-stick material or applying other non-stick treatment, reducing both the amount of dentifrice that must be drawn while reducing adhesion with the chamber walls. By keeping the dentifrice in the dentifrice chamber 506 within close proximity to the dental floss 502, its affinity to attach to the dental floss 502 remains greater than the inside surface 508 of the dentifrice chamber 506. This is suitable for a configuration that will be frequently refilled, such as the variant that is attached to a toothpaste tube, since the limited the quantity of dentifrice creates the need to frequently refill the dentifrice chamber 506.

Figure 6:
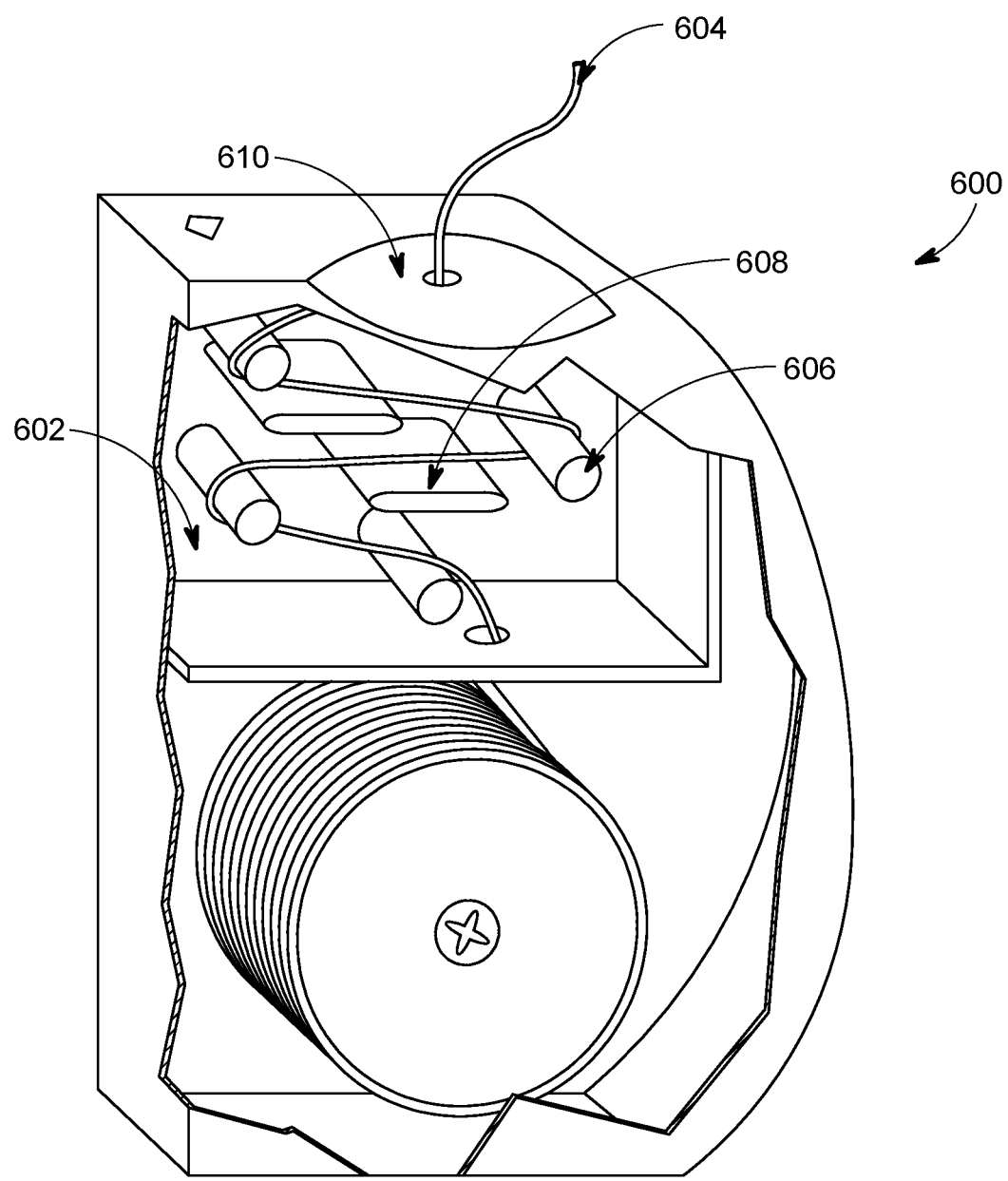
FIG. 6 is a view of a sixth aspect of a dental hygiene device according to the disclosure.

FIG. 6 is a view of a sixth aspect of a dental hygiene device 600 according to the disclosure. The dental hygiene device 600 illustrated in FIG. 6 solves the floss adherence problem by directing the dental floss 604 to move across the chamber 602 around floss directing elements, such as pegs 606 and optionally adding other floss directing elements, such as baffles 608 between them to enhance the ability for the dentifrice chamber 602 to accumulate along those pathways. This may be in conjunction with lining the chamber walls with non-stick material or applying other non-stick treatment. This allows for a larger dentifrice chamber 602, and thus a reduced rate of refilling the dentifrice chamber 602. The dental hygiene device 600 may include an indentation at the location of the aperture where the floss exits the device 610 to aid in regulating the movement of the floss during use, and other contours which may improve usage while the dental hygiene device 600 is being held in hand while flossing. Other floss directing elements, such as bladders or other elements may be used as well.

Figure 7:
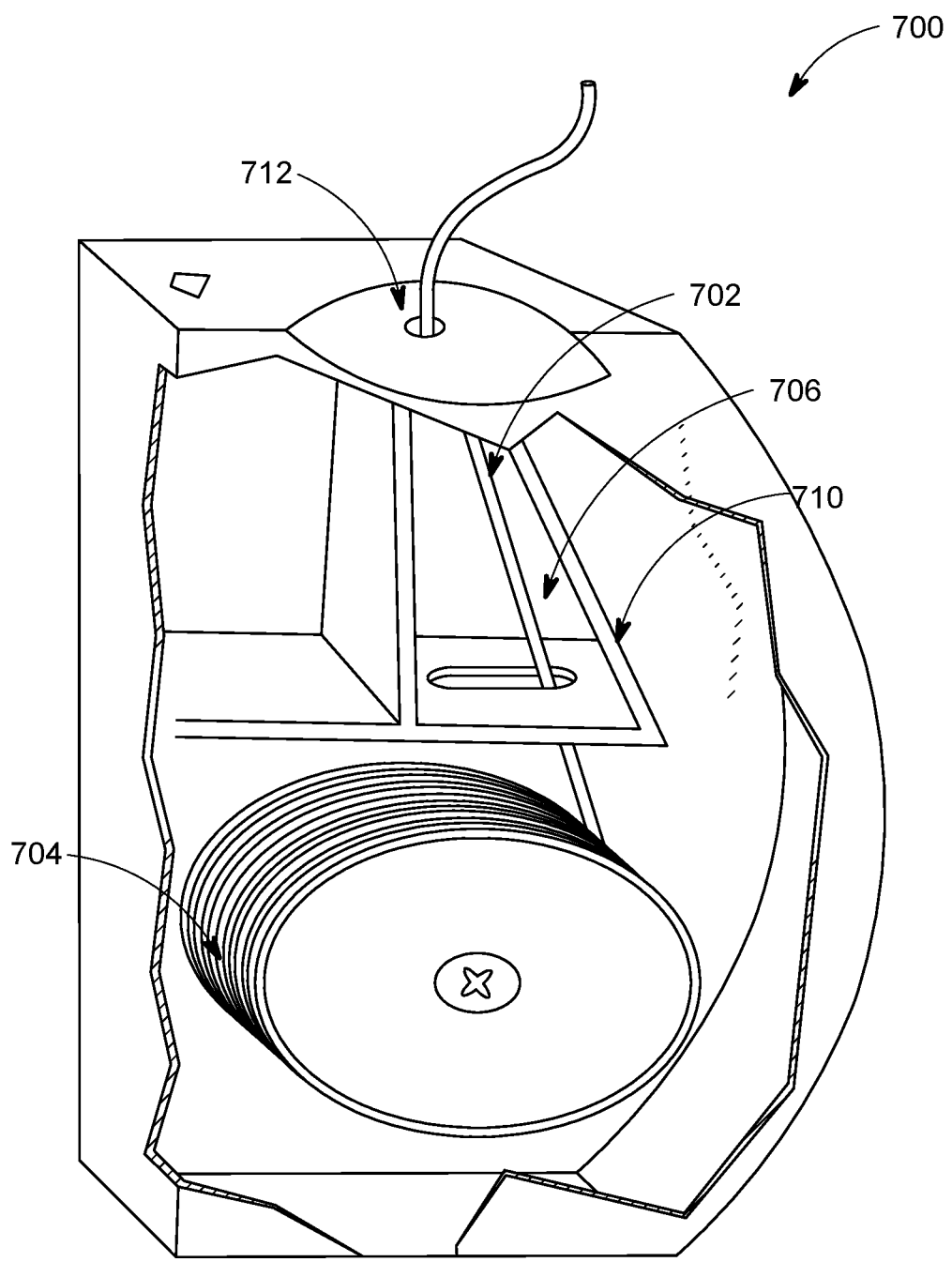
FIG. 7 is a view of a seventh aspect of a dental hygiene device according to the disclosure.

FIG. 7 is a view of a seventh aspect of a dental hygiene device 700 according to the disclosure. The dental hygiene device 700 illustrated in FIG. 7 solves the floss adherence problem by configuring the dental hygiene device 700 so that as the dental floss is drawn from the spool 704, it produces lateral movement to the dental floss 702, causing the dental floss 702 to sweep across the dentifrice chamber 706, thus maintaining contact between the dental floss 702 and toothpaste dentifrice solution and preventing ruts. This may be in conjunction with lining the chamber walls with non-stick material or applying other non-stick treatment. It was surprising to find that moving the dental floss 702 through the toothpaste dentifrice solution in this manner has a similar effect as narrowing the dentifrice column, causing the toothpaste dentifrice solution to adhere to the dental floss 702 and produce the desired results of drawing the dentifrice toward the exit aperture 712 even with a wider column of toothpaste dentifrice solution. The primary advantage is that this allows for a larger dentifrice chamber, reducing the frequency of refilling the chamber. Producing this needed lateral movement can be accomplished with the dental hygiene device 700, where the dental floss 702 may be drawn from an asymmetric, eccentric spool 704, creating a lateral movement of the departure point when the asymmetric, eccentric spool 704 rotates as the eccentric spool 704 is retracted. The dentifrice chamber 706 can be modified so that the side walls 710 run parallel to where the floss path is farthest from the centerline. This lateral floss movement keeps the dental floss 702 in contact with toothpaste dentifrice solution and acts to draw and pool the dentifrice closer to the exit aperture 712 which dams any toothpaste dentifrice solution in excess of what is consumed by coating the dental floss as it exits the dentifrice chamber 706. As toothpaste dentifrice solution is depleted in the dentifrice chamber 706, the remaining toothpaste dentifrice solution migrates toward the narrowing chamber in front of the exit aperture 712, maintaining a continual pool for adherence.

Figure 8:
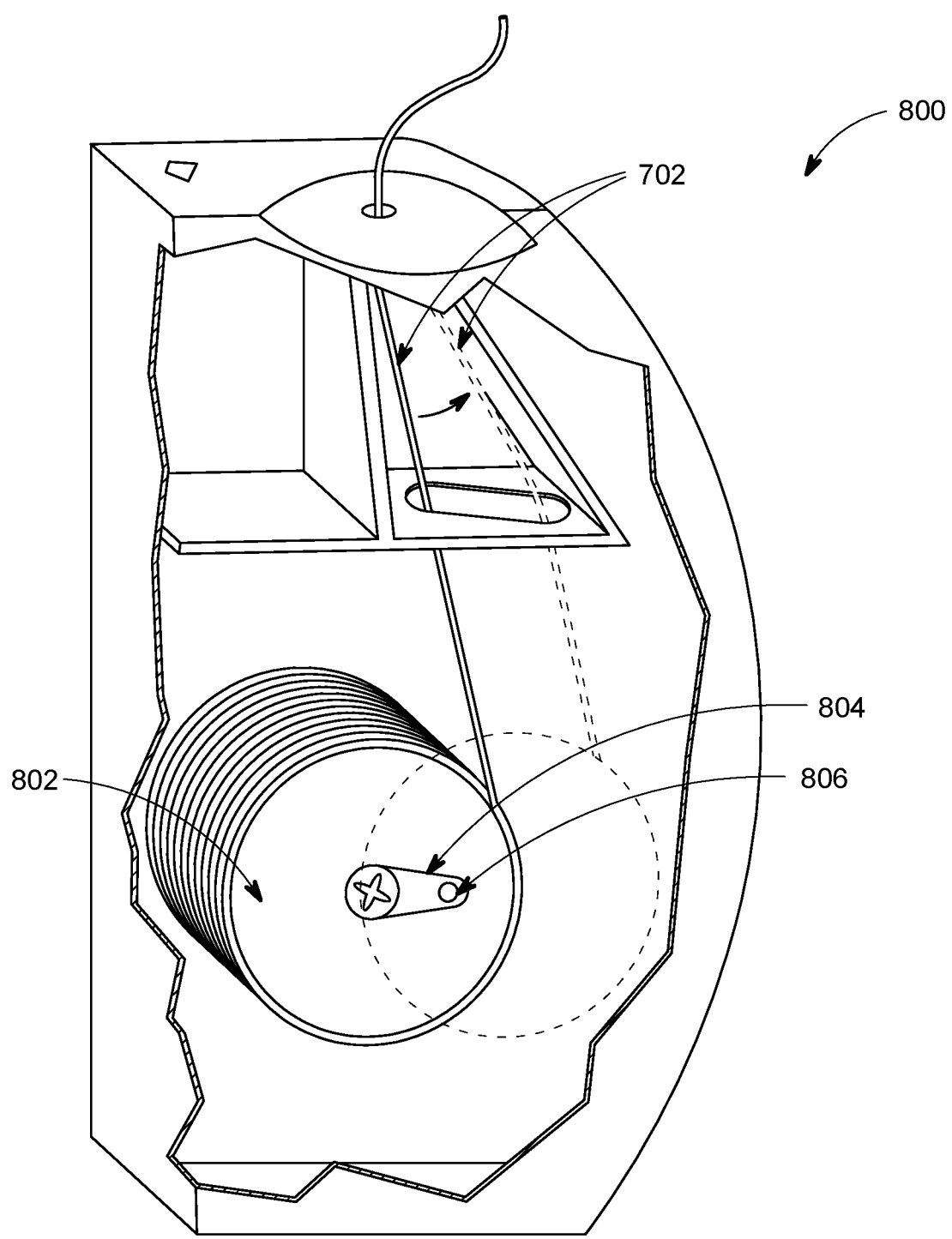
FIG. 8 is a view of an eighth aspect of a dental hygiene device according to the disclosure.

FIG. 8 is a view of an eighth aspect of a dental hygiene device 800 according to the disclosure. The dental hygiene device 800 illustrated in FIG. 8 solves the floss adherence problem by mounting a circular spool 802 on an arm 804 centered on a pivot pin to offset the circular spool 802, or a cam, for example, causing this same asymmetry and resulting in a similar lateral movement of the dental floss 702 as circular spool 802 rotates. This requires more space and therefore a larger device, because of the larger pathway that the circular spool 802 covers.

Figure 9:
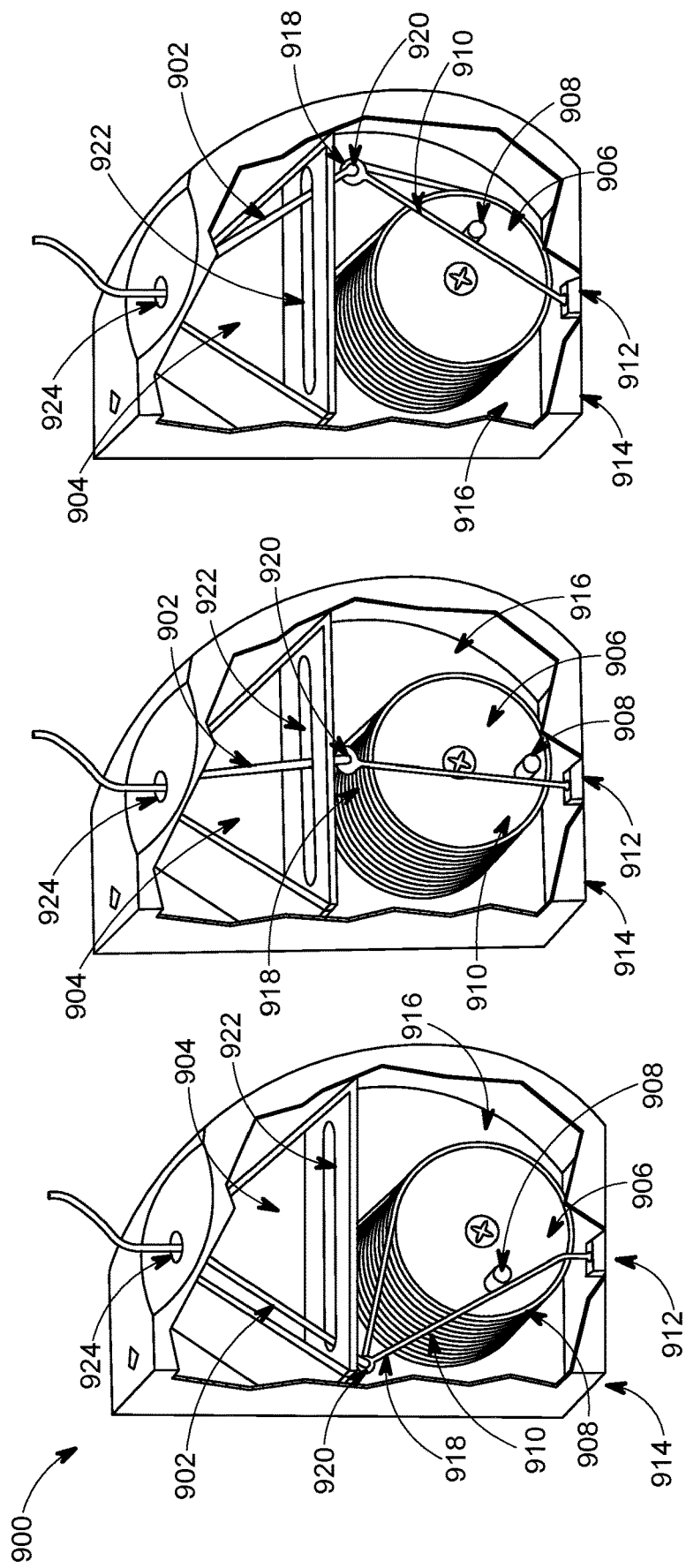
FIG. 9A-9C is a view of a ninth aspect of a dental hygiene device according to the disclosure.

FIGS. 9a-9c are views of ninth aspect of a dental hygiene device 900 according to the disclosure. The dental hygiene device 900 illustrated in FIGS. 9a-9c solves the floss adherence problem by, in conjunction with lining the dentifrice chamber with non-stick material or applying a non-stick treatment, providing a mechanism that creates the lateral floss movement described in relation to FIGS. 7 and 8, causing the end of the dental floss 902 to move back and forth from one side of the second, dentifrice chamber 904 to the other side of the dentifrice chamber 904 as dental floss 902 is drawn from the spool 906. FIGS. 9a-9c illustrate this mechanism. A peg 908 is affixed to the spool 906 so that the peg 908 rotates with the spool 906 as the dental floss 902 is drawn from the spool 906. A different floss directing implement, such as a guide wire 910, in an aspect a spring steel wire or other elastic but largely rigid member, adjacent to the spool 906, has a first end 912 movably and pivotably affixed to a base 914 of the first, floss chamber 916. A second end 918 of the guide wire 910 moves freely and has a hole 920 that the floss is threaded through as it leaves the spool 906 and exits the floss chamber 916. The guide wire 910 is tensioned so that, in position 1 illustrated in FIG. 9a, the guide wire 910 is pressed toward the left side of the floss chamber 916 by spring action but prevented from moving further to the right by the peg 908. As the spool 906 rotates, the peg 908 moves with it (illustrated in FIG. 9b), straightening the guide wire 910 and then pressing the guide wire 910 toward an opposite side of the floss chamber 916 (illustrated in FIG. 9c). The resulting lateral displacement at second, free end of the guide wire 910 causes the hole 920 at that second end 918 to move across the floss chamber 916, thus guiding the dental floss 902 to swing from the left side to the right side as dental floss 902 is drawn from the spool 906 and exits the floss chamber 916 (via the slotted aperture 922). This lateral displacement as the dental floss 902 exits the floss chamber 916 changes the pathway by which the dental floss 902 travels through the dentifrice chamber 904 toward the fixed aperture 924 where it exits the dental hygiene device 900, as depicted in FIGS. 9a-9c. The advantage of this approach is that it produces far more lateral floss movement, allowing the floss 902 to remain in contact with the dentifrice and preventing rutting across a far greater dentifrice chamber 904 size. This is most suitable to a handheld version, particularly the mechanism to amplify lateral floss movement because it supports a compact design and may permit sufficient dentifrice volume to not require replenishment before the floss spool 906 is consumed.

FIGS. 9a-9c provide a view of three positions of the spool 906 and peg 908. FIG. 9a depicts the guide wire 910 in its far-left position, with the guide wire 910 held from springing further to the right by the peg 908. The hole 920 in its second end 918 holds the dental floss 902 to enter on the far-left side of the dentifrice chamber 904 through a slotted aperture 922 between the chambers. The second position, illustrated in FIG. 9b is with the spool 906 rotated 90 degrees, translating the peg 908 to the bottom of the spool 906. This allows the spring wire to translate to the center of the spool 906, with the hole 920 at the tip causing the dental floss 902 to enter the dentifrice chamber 904 at its center. The third position, illustrated in FIG. 9c shows the spool 906 rotated 180 degrees, translating the peg to the far-right side along with the guide wire 910, causing the dental floss 902 to enter the dentifrice chamber 904 on the far-right side through the slotted aperture 922. This mechanism allows for the dental floss 902 to sweep across a much larger dentifrice chamber 904, better utilizing the available space within the dental hygiene device 900. Not shown are the subsequent positions, where the spool 906 rotates forward causing the peg 908 and thus the guide wire 910 to begin moving back to the left again. It is important to note that although the floss spool 906 is depicted as circular, it may instead have an eccentric or non-circular shape to facilitate the movement of the spring wire as the peg rotates with the spool, supporting the operation of this mechanism.

In an aspect of the disclosure, a non-stick material or treatment may be deposited on an inner surface of the second chamber 904 to promote drawing the toothpaste dentifrice solution contained in the second chamber 904 toward the second outlet aperture as the dental floss 902 passes through the second chamber 904 while promoting adhesion of the toothpaste dentifrice solution onto the surface of the dental floss 902.

Figure 10:
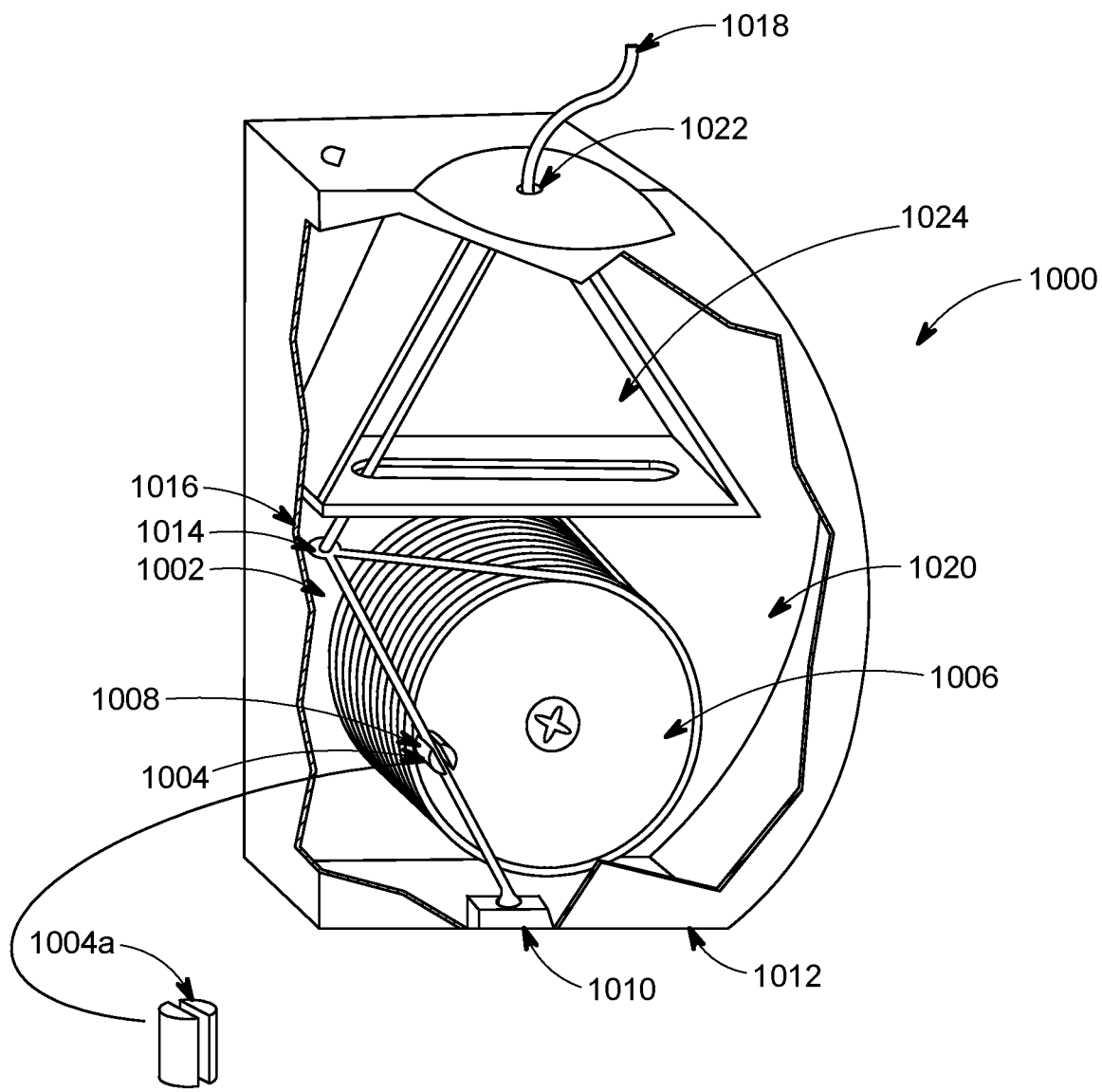
FIG. 10 is a view of a tenth aspect of a dental hygiene device according to the disclosure.

FIG. 10 illustrates a tenth view of a dental hygiene device 1000. The dental hygiene device 1000 operates in a similar manner as the dental hygiene device 900 illustrated in FIGS. 9a-9c, in conjunction with lining the dentifrice chamber with non-stick material or applying a non-stick treatment. The dental hygiene device 1000 includes a different floss directing implement, in an aspect a solid, non-flexible rod 1002 instead of the guide wire 910 in FIGS. 9a-9c. FIG. 10 illustrates that the peg 1004 is now slotted and is free to rotate within the spool 1006, as shown in the blown-up view 1004a. The rod 1002 is inserted into the slot within the peg 1004 and is free to slide back and forth through the slot 1008. A first end of the rod 1002 is pivotably hinged at the base 1012 of the dental hygiene device 1000 so that its angle can change as the peg 1004 changes position when the spool 1006 rotates. A second, free end 1014 of the rod 1002 is unrestrained and contains a hole 1016 through which the dental floss 1018 must pass as it leaves the spool 1006 and exits the floss chamber 1020. As the spool 1006 rotates, the peg 1004 moves with it, causing the rod 1002 captured by its slot 1008 to move with it as well just as the guide wire 910 in FIGS. 9a-9c moved from position 1 to position 3 in FIGS. 9a-9c. The resulting lateral displacement at end of the rod causes the hole 1016 to move across the floss chamber 1020, thus guiding the dental floss 1018 exiting the floss chamber 1020 to swing from the left side to the right side as dental floss 1018 is drawn from the spool 1006. This lateral displacement changes the pathway by which the dental floss 1018 travels through the dentifrice chamber 1024 toward a fixed exit aperture 1022.

Figure 11:
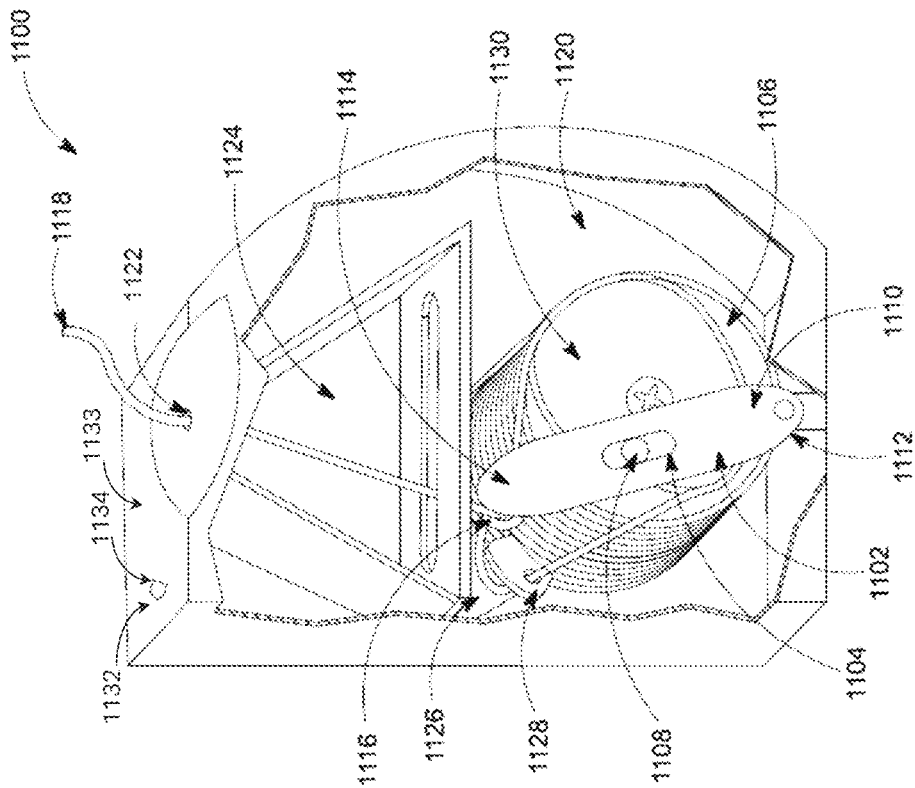
FIG. 11 is a view of an eleventh aspect of a dental hygiene device according to the disclosure.

FIG. 11 illustrates an eleventh view of the dental hygiene device 1100. The dental hygiene device 1100 operates in a similar manner as the dental hygiene device 900 illustrated in FIGS. 9a-9c, in conjunction with lining the dentifrice chamber with non-stick material or applying a non-stick treatment. In an aspect of the disclosure, the floss 1118 is drawn from the spool 1106 and is directed around a post 1126 and through an aperture in the post 1128 which guides the floss 1118 onto a non-circular or eccentric spool, such as a non-circular pulley or cam 1130, which rotates on the same axis but independently from the floss spool 1106. The peg 1108 is affixed to the non-circular or eccentric spool 1130 so that the peg 1108 rotates with the non-circular or eccentric spool 1130 as the dental floss 1118 is drawn from the spool 1106 and onto the non-circular pulley or cam 1130. The dental hygiene device 1100 includes a solid, non-flexible rod 1102 instead of the guide wire 910 in FIGS. 9a-9c. FIG. 11 illustrates that the rod 1102 includes a slot 1104, through which peg 1108 is inserted into within the rod 1102 and is free to rotate and slide back and forth within the slot 1104. A first end 1110 of the rod 1102 is pivotably hinged at the base 1112 of the dental hygiene device 1100 so that its angle can change as the peg 1108 changes position when the cam 1130 rotates. A second, free end 1114 of the rod 1102 is unrestrained and contains a hole 1116 through which the dental floss 1118 must pass as it leaves the non-circular or eccentric spool 1130 and exits the floss chamber 1120. The resulting lateral displacement at an end of the rod 1102 causes the hole 1116 to move across the floss chamber 1120, thus guiding the dental floss 1118 exiting the floss chamber 1120 to swing from the left side to the right side as dental floss 1118 is drawn from the spool 1106. This lateral displacement changes the pathway by which the dental floss 1118 travels through the dentifrice chamber 1124 toward a fixed exit aperture 1122. An unexpected result from developing the disclosed dental hygiene device 1100 was that the need for the pulley to be specifically shaped based on the dimensions and configuration of other components of this the disclosed dental hygiene device 1100 was not anticipated and could only be determined through trial-and-error, producing physical prototypes and performing multiple rounds of testing. In another aspect of the disclosure, the dental hygiene device 1100 may include a tab 1132 positioned on a surface 1133 of the dental hygiene device 1100, where the tab 1132 is angled outwardly relative to the surface 1133, and the tab 1132 may include a clipper edge 1134 configured to accept the floss 1118 and sever the floss 1118. When flossing is complete, the floss 1118 may be cut off on the clipper edge 1134.

In an aspect of the disclosure, the dental hygiene device 1100 may have dimensions of 2.74 inches height, 1.84 inches width, and 0.74 inches thick. These dimensions may vary during tooling and production. In an aspect, a smaller or larger floss spool might be used for other versions, such as a convenient travel version, which may reduce or increase these dimensions, respectively. Another aspect may include three sizes for users' different sized hands, a left-handed version as required by the application and needs of the user. In an aspect, the exit aperture may have a diameter of between larger than the diameter of the dental floss to of 1.5 times the diameter of the dental floss, or greater as determined by testing to regulate the amount of toothpaste dentifrice solution that passes through the exit aperture on the dental floss.

Figure 12:
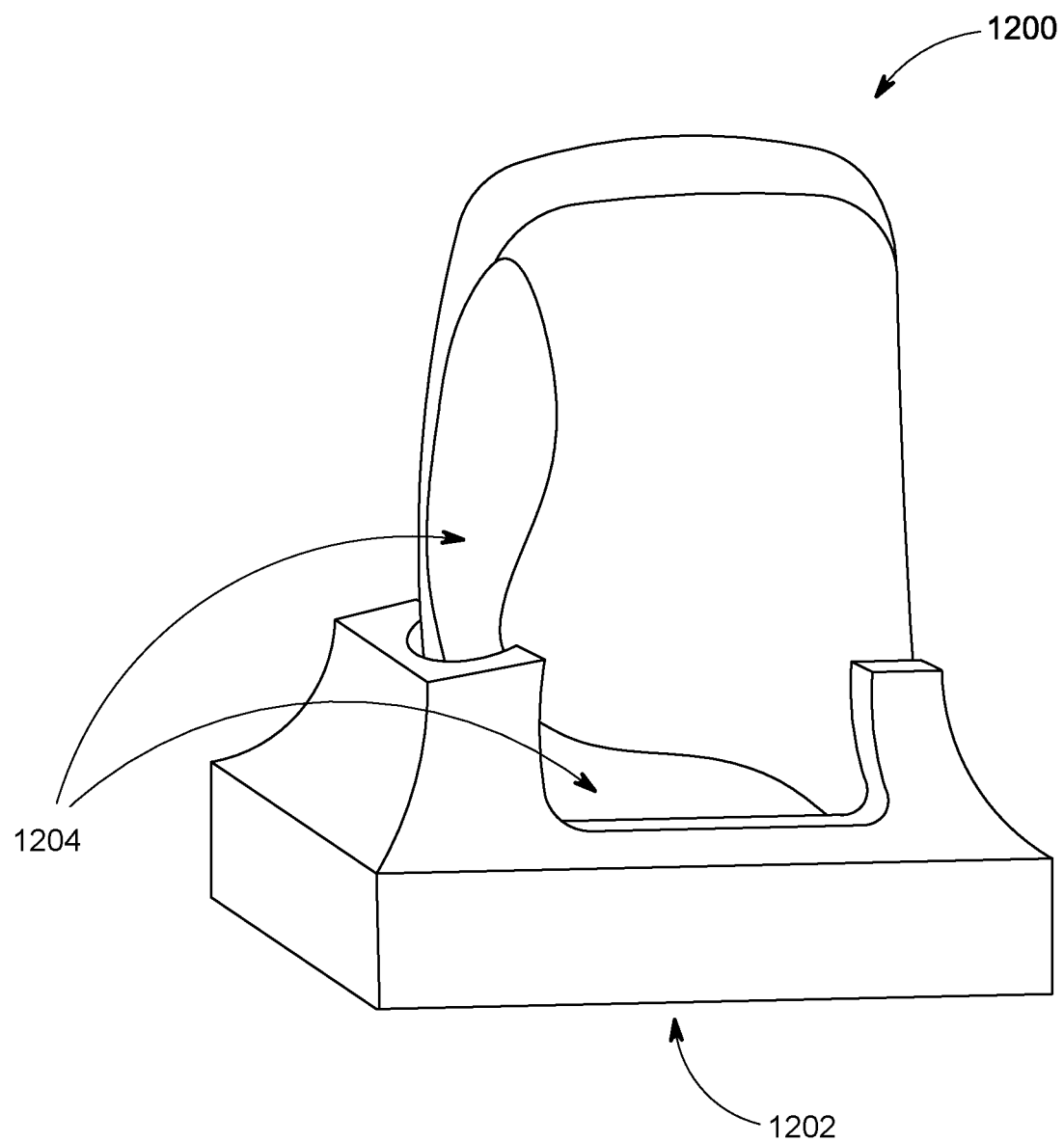
FIG. 12 is a view of a twelfth aspect of a dental hygiene device according to the disclosure.

FIG. 12 illustrates another aspect of a dental hygiene device 1200, such as the dental hygiene device illustrated in relation to FIGS. 9a-9c, 10 and 11, where the dental hygiene device 1200 is configured to mate with a floss dispenser stand 1202. The floss dispenser stand 1202 may be configured for holding the dental hygiene device 1200 vertically between usages, so that the dental hygiene device 1200 rests vertically with the second chamber (illustrated and discussed above as second chamber 904 in FIGS. 9a-9c) within the dental hygiene device 1200 positioned at a bottom of the floss dispenser stand 1202 to allow the toothpaste dentifrice solution to settle near the aperture (illustrated and discussed above as aperture 1022 in FIG. 10) through which the floss exits the dental hygiene device 1200. This configuration may aid in allowing a better adhesion or coverage of the toothpaste dentifrice solution on the dental floss within the second chamber.

In an aspect, the dispenser stand 1202 is configured to cover an aperture (illustrated and discussed above as aperture 1022 in FIG. 10) where the dental floss exits the dental hygiene device 1200 when the dental hygiene device 1200 is not in use.

In an aspect, the dental hygiene device 1200 may include one or more contours 1204 on an outer surface of the dental hygiene device 1200. In an aspect, the one or more contours may aid in allowing a user to hold the dental hygiene device 1200 more comfortably and allow better positioning of the dental hygiene device 1200 for flossing the user's teeth. The one or more contours 1204 may be indented into the surface of the dental hygiene device 1200, and/or may have surfaces on the one or more contours 1204 that are rough, grooved or bumpy to allow a better grip of the fingers on the one or more contours 1204.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A dental hygiene device for cleaning between surfaces of teeth, the device comprising:
   a first chamber containing dental floss positioned around a spool, the first chamber positioned within the dental hygiene device;
   where the first chamber comprises a first aperture configured as a longitudinal-shaped slot through which the dental floss exits the first chamber;
   a second chamber containing a toothpaste dentifrice, the second chamber positioned proximate to the first chamber, where the second chamber is positioned within the dental hygiene device, and the second chamber comprises:
   an inlet aperture positioned on a first surface of the second chamber and proximate to and in mechanical communication with the first aperture of the first chamber,
   where the dental floss that exits the first chamber enters the inlet aperture of the second chamber,
   where the second chamber is configured to allow the dental floss to receive a thin coat of the toothpaste dentifrice on a surface of the dental floss while passing through the second chamber;
   a spool onto which the floss is directed, the spool positioned within the first chamber, the spool with a floss directing implement causing the dental floss to move back and forth from a first side of the first chamber to a second side of the first chamber with respect to a center of the first chamber as the dental floss is drawn from the spool and through the floss directing implement, and changing an angle and a path that the dental floss exits the first chamber through a longitudinal slotted outlet aperture through which the dental floss exits the first chamber and the inlet aperture into the second chamber, causing the dental floss to move back and forth from a first end of the longitudinal slot to a second opposite end, causing the dental floss to sweep across the second chamber as it is drawn through the second chamber, causing contact with the toothpaste dentifrice; and adherence of the toothpaste dentifrice onto the surface of the dental floss as it passes through the second chamber; and a second outlet aperture positioned on a second surface of the second chamber, where the dental floss exits the second outlet aperture and out of the dental hygiene device through the second outlet aperture, where a diameter of the second outlet aperture is sized with a diameter to regulate an amount of toothpaste dentifrice that passes through the second outlet aperture on the dental floss to allow a continuous distribution of abrasive ingredients to coat the dental floss, and to allow a dentifrice thickness to pass through that leaves a sufficiently thin film that does not interfere with flossing.

2. The dental hygiene device of claim 1, where the spool comprises any of a spool, pulley or cam with a non-circular cross-section or an eccentric cross-section.

3. The dental hygiene device of claim 1, where the floss directing implement comprises a non-flexible rod, the rod having a first end movably and pivotably fixed to an interior base surface of the dental hygiene device, with a second end of the rod free to move; where the rod has a hole in the second end that the dental floss is threaded through as it leaves the spool; where the rod is inserted in a slot within a peg affixed to the spool so the peg can rotate freely within the spool; where the spool rotates as the floss is drawn from the spool, thereby causing the peg to move with the spool, resulting in a lateral displacement of the peg and causing movement of the rod inserted in the peg through the slot, causing an end of the rod through which the dental floss is threaded to swing back and forth from the first side of the first chamber to the second side of the first chamber with respect to the center of the first chamber, causing the dental floss to move back and forth as the dental floss exits the first chamber into the second chamber; causing the dental floss to sweep across the second chamber as it is drawn through the second chamber, causing contact with the toothpaste dentifrice and the adherence of the toothpaste dentifrice to the dental floss.

4. The dental hygiene device of claim 1, where the floss directing implement comprises a rod, where the rod comprises a first end movably and pivotably fixed to an interior base surface of the dental hygiene device, with a second end of the rod free to move; where the rod has a hole in the second end through which the floss is threaded as it leaves the spool; where the rod includes a slot through which a peg that is affixed to the spool is inserted into within the rod such that the peg can move back and forth and rotate freely within the slot; where the spool rotates as the dental floss is drawn from the spool, causing the peg to move with the spool, resulting in a lateral displacement of the peg and causing movement of the rod through which the peg is inserted, causing a rod end through which the dental floss is threaded to move back and forth from a first side of the first chamber to a second side of the chamber with respect to a center of the first chamber, causing the dental floss to move back and forth as the dental floss exits the first chamber and into the second chamber, causing the dental floss to sweep across the second chamber as it is drawn through the second chamber, causing contact with the toothpaste dentifrice and adherence of the toothpaste dentifrice to the dental floss.

5. The dental hygiene device of claim 1, where the dental hygiene device further comprises a tab positioned on a surface of the dental hygiene device, where the tab is angled outwardly relative to the surface of the dental hygiene device, and the tab comprises a clipper edge configured to accept the dental floss and sever the dental floss.

6. The dental hygiene device of claim 1, where the toothpaste dentifrice comprises a semi-solid material with mild abrasive qualities and a viscosity and a thickness of toothpaste.

7. The dental hygiene device of claim 1, further comprising an opening to reveal an inside of the dental hygiene device for filling the second chamber containing the toothpaste dentifrice and replacing the spool; and where the opening is configured as a movably sealable opening to fill the second chamber while preventing leakage through the dental hygiene device during use.

8. The dental hygiene device of claim 1, further comprising a non-stick material or treatment deposited on an entirety of an inner surface of the second chamber to promote drawing the toothpaste dentifrice contained in the second chamber toward the second outlet aperture as the dental floss passes through the second chamber while promoting adhesion of the toothpaste dentifrice onto the surface of the floss.

9. The dental hygiene device of claim 1, further comprising a chamber insert containing the dentifrice, positioned within the second chamber to maintain the toothpaste dentifrice in proximity with the dental floss as the toothpaste dentifrice is consumed during use and adhesion of the toothpaste dentifrice onto the surface of the dental floss as it passes through the dentifrice and configured to replenish dentifrice in the chamber.

10. The dental hygiene device of claim 9, where the chamber insert comprises at least one of a membrane, a bladder or a combination thereof, further comprising a non-stick material or treatment deposited on the inner surface.

11. The dental hygiene device of claim 1, where a housing size and a housing shape are configured to be held during flossing, with a housing shape that includes contours; and
   an indentation at a location of the second outlet aperture where the floss exits the dental hygiene device to aid in regulating movement of the floss during use, to facilitate the dental hygiene device to be held while drawing the dental floss coated with the toothpaste dentifrice from the dental hygiene device during flossing.

12. The dental hygiene device of claim 1, where the dental hygiene device is configured to mate with a stand for holding the dental hygiene device vertically between usages, where the dental hygiene device rests vertically with the second chamber positioned toward a bottom of the stand to allow the toothpaste dentifrice to settle near the second outlet aperture through which the dental floss exits the dental hygiene device, and the stand is configured to cover the second outlet aperture when the dental hygiene device is not in use.

13. A dental hygiene device for cleaning between surfaces of teeth, the device comprising:
   a first chamber containing dental floss positioned around a spool, the first chamber positioned within the dental hygiene device;
   where the first chamber comprises a first aperture configured as a longitudinal-shaped slot through which the dental floss exits the first chamber;
   a second chamber containing a toothpaste dentifrice, the second chamber positioned proximate to the first chamber, where the second chamber is positioned within the dental hygiene device, and the second chamber comprises:
   an inlet aperture positioned on a first surface of the second chamber and proximate to and in mechanical communication with the first aperture of the first chamber,
   where the dental floss that exits the first chamber enters the inlet aperture of the second chamber,
   where the second chamber is configured to allow the dental floss to receive a thin coat of the toothpaste dentifrice on a surface of the dental floss while passing through the second chamber;
   a spool onto which the floss is directed, the spool positioned within the first chamber, the spool with a floss directing implement causing the dental floss to move back and forth from a first side of the first chamber to a second side of the first chamber with respect to a center of the first chamber as the dental floss is drawn from the spool and through the floss directing implement, and changing an angle and a path that the dental floss exits the first chamber through a longitudinal slotted outlet aperture through which the dental floss exits the first chamber and the inlet aperture into the second chamber, causing the dental floss to move back and forth from a first end of the longitudinal slot to a second opposite end, causing the dental floss to sweep across the second chamber as it is drawn through the second chamber, causing contact with the toothpaste dentifrice; and adherence of the toothpaste dentifrice onto the surface of the dental floss as it passes through the second chamber;
   a second outlet aperture positioned on a second surface of the second chamber, where the dental floss exits the second outlet aperture and out of the dental hygiene device through the second outlet aperture, where a diameter of the second outlet aperture is sized with a diameter to regulate an amount of toothpaste dentifrice that passes through the second outlet aperture on the dental floss to allow a continuous distribution of abrasive ingredients to coat the dental floss, and to allow a dentifrice thickness to pass through that leaves a sufficiently thin film that does not interfere with flossing; and
   where the floss directing implement comprises a rod, where the rod comprises a first end movably and pivotably fixed to an interior base surface of the dental hygiene device, with a second end of the rod free to move; where the rod has a hole in the second end through which the floss is threaded as it leaves the spool; where the rod includes a slot through which a peg that is affixed to the spool is inserted into within the rod such that the peg can move back and forth and rotate freely within the slot; where the spool rotates as the dental floss is drawn from the spool, causing the peg to move with the spool, resulting in a lateral displacement of the peg and causing movement of the rod through which the peg is inserted, causing a rod end through which the dental floss is threaded to move back and forth from a first side of the first chamber to a second side of the chamber with respect to a center of the first chamber, causing the dental floss to move back and forth as the dental floss exits the first chamber and into the second chamber, causing the dental floss to sweep across the second chamber as it is drawn through the second chamber, causing contact with the toothpaste dentifrice and adherence of the toothpaste dentifrice to the dental floss.

* * * * *